(12) United States Patent
Stanton et al.

(10) Patent No.: US 6,416,116 B1
(45) Date of Patent: Jul. 9, 2002

(54) INTERIOR STRUCTURE OF A MASS TRANSIT VEHICLE

(75) Inventors: William H. Stanton; Glenn Campbell; William Holowaty, all of Winnipeg (CA)

(73) Assignee: New Flyer Industries Limited, Winnipeg (CA)

( * ) Notice: Subject to any disclaimer, the term of this patent is extended or adjusted under 35 U.S.C. 154(b) by 0 days.

(21) Appl. No.: 09/496,686

(22) Filed: Feb. 3, 2000

(51) Int. Cl.$^7$ .......................... B60H 1/32; B60R 27/00; B61D 17/00; B61D 27/00

(52) U.S. Cl. ........................ 296/178; 296/208; 296/1.1; 454/108; 105/461

(58) Field of Search ................................ 296/178, 208, 296/1.1; 454/136, 137, 108, 109, 112; 105/461, 354; 62/244

(56) References Cited

U.S. PATENT DOCUMENTS

| | | | | |
|---|---|---|---|---|
| 912,553 A | * | 2/1909 | Fitzgerald et al. | 454/108 |
| 2,000,477 A | * | 5/1935 | Carry | 62/244 |
| 2,005,769 A | * | 6/1935 | Arf | 62/244 |
| 2,033,069 A | * | 3/1936 | Hagen et al. | 454/108 |
| 2,080,960 A | * | 5/1937 | Dreyfuss | 454/108 |
| 2,089,799 A | * | 8/1937 | Hulse | 454/112 |
| 2,165,559 A | * | 7/1939 | Lintern | 454/137 |
| 2,251,660 A | * | 8/1941 | Chipley | 454/108 |
| 2,251,682 A | * | 8/1941 | Leadbetter | 454/108 |
| 2,294,363 A | * | 9/1942 | Brockway | 296/208 |
| 2,426,582 A | * | 9/1947 | Austin | 296/178 |
| 2,502,320 A | * | 3/1950 | Guernsey | 296/178 |
| 2,775,186 A | * | 12/1956 | Strobell | 454/109 |
| 3,218,821 A | * | 11/1965 | Spatt | 62/244 |
| 3,308,738 A | * | 3/1967 | Heimann | 454/90 |
| 3,330,200 A | * | 7/1967 | Gillick et al. | 454/108 |
| 3,862,549 A | * | 1/1975 | Fernandes | 62/419 |
| 4,353,313 A | * | 10/1982 | Panagin | 296/178 |
| 4,477,099 A | * | 10/1984 | Luyckx | 296/178 |
| 4,570,545 A | * | 2/1986 | Sherrow | 105/354 |
| 4,574,336 A | | 3/1986 | Mikalonis | |
| 4,607,497 A | * | 8/1986 | Ferdow et al. | 62/179 |
| 4,843,826 A | * | 7/1989 | Malaker | 62/244 |
| 4,888,959 A | * | 12/1989 | Brown | 64/244 |
| 5,001,905 A | * | 3/1991 | Miyazaki | 64/244 |
| 5,005,372 A | * | 4/1991 | King | 62/244 |
| 5,038,256 A | * | 8/1991 | Burkarth | 362/74 |
| 5,116,280 A | * | 5/1992 | Kloster | 454/137 |
| 5,120,271 A | * | 6/1992 | Shtanko | 454/137 |
| 5,307,645 A | * | 5/1994 | Pannell | 62/244 |
| 5,441,326 A | * | 8/1995 | Mikalonis | 296/208 |
| 5,464,273 A | * | 11/1995 | Makoto | 297/232 |
| 5,531,641 A | * | 7/1996 | Aldrich | 454/137 |
| 5,575,453 A | * | 11/1996 | Dion | 454/108 |
| 5,857,758 A | | 1/1999 | Dealey, Jr. et al. | |
| 6,257,652 B1 | * | 7/2001 | Stanton | 296/178 |
| 6,340,202 B1 | * | 1/2002 | Stanton et al. | 296/201 |

* cited by examiner

Primary Examiner—Stephen T. Gordon
Assistant Examiner—Hilary Gutman
(74) Attorney, Agent, or Firm—Adrian D. Battison; Michael R. Williams

(57) ABSTRACT

A public transit vehicle has a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows. Stanchions for supporting passengers while standing are shaped so that they curve upwardly and outwardly of the aisle to a wider spacing at the ceiling than at the seats. Between two stanchion mounting rails is provided a central ceiling panel dropped from the roof to define an air supply duct longitudinally along the aisle above the passengers. This is supplied with ventilation air by a roof mounted system and communicates by individual sub-ducts with a series of fans in the side walls. A flap valve at the fan can be operated to cause heated air when required to be supplied through the main side wall posts to bottom discharge openings at the bottom interior panels or to cause cooled air to be supplied to a duct along the top of the windows.

24 Claims, 4 Drawing Sheets

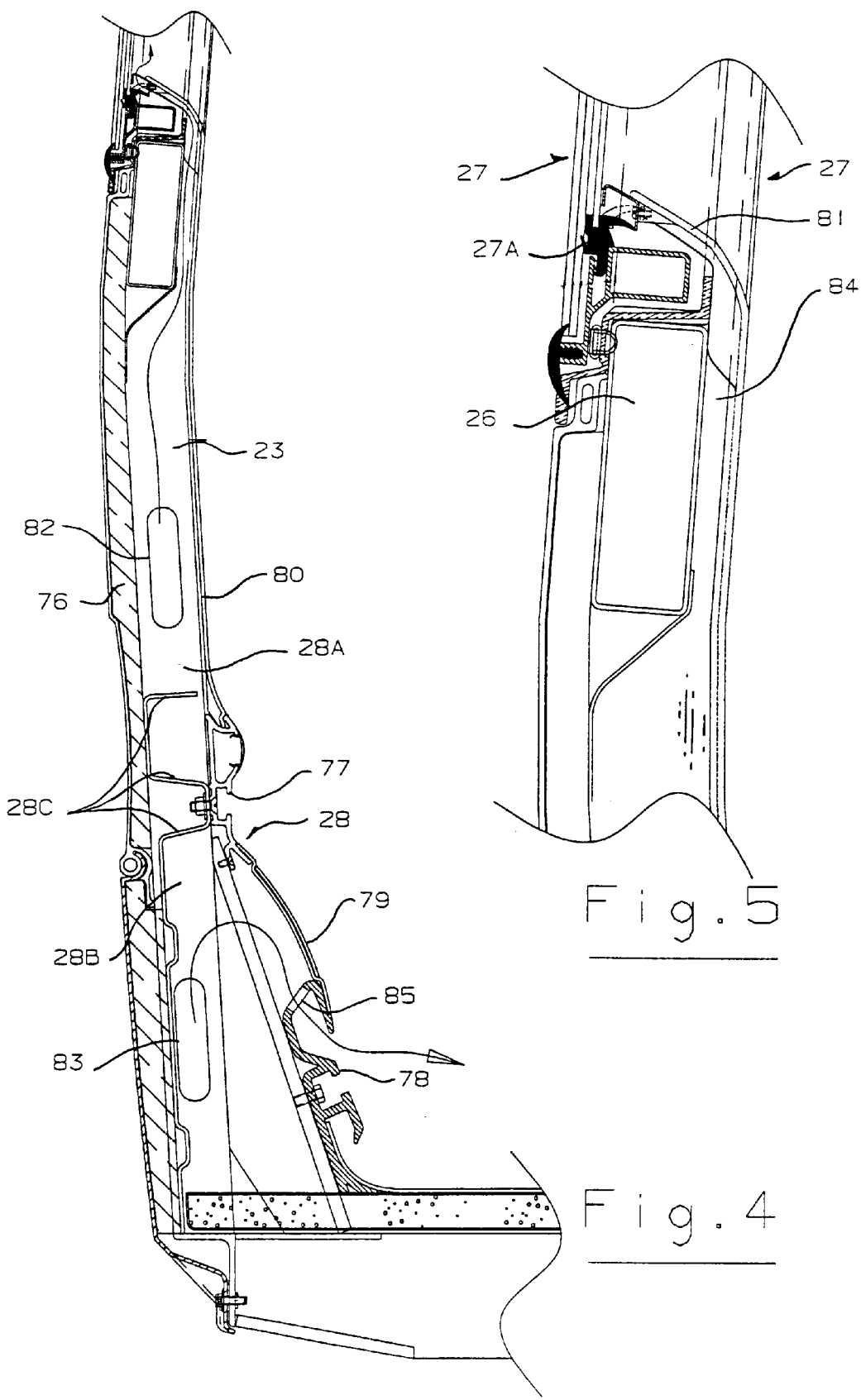

INTERIOR STRUCTURE OF A MASS TRANSIT VEHICLE

This invention relates to an interior structure for a passenger area of a mass transit vehicle.

This application is related to a series of four further applications all filed simultaneously with this application and assigned to the same assignee as follows:

application Ser. No. 09/497,634 filed Feb. 3, 2000 and entitled Passenger Lighting System for Mass Transit Vehicle;

application Ser. No. 09/497,633 filed Feb. 3, 2000 and entitled Side Impact Structure for Mass Transit Vehicle;

application Ser. No. 09/496,684 filed Feb. 3, 2000 and entitled Body Structure of Mass Transit Vehicle;

application Ser. No. 09/496,685 filed Feb. 3, 2000 and entitled Window Structure for Mass Transit Vehicle.

The disclosures of all the above are incorporated herein by reference.

BACKGROUND OF THE INVENTION

Mass transit vehicles and particularly buses generally provide a central aisle and two rows of seats each on a respective side of the aisle and adjacent the side windows. For the safety of standing and moving passengers it is necessary to provide a series of stanchions along the aisle on respective sides of the aisle and extending either from the floor or from a seat to the ceiling so that the stanchion can be readily grasped by the hand of the passenger when standing or moving. The top of the stanchion must therefore be attached at the roof or ceiling of the vehicle and for this purpose longitudinal rails are commercially available attached to the interior of the roof to receive the top end of the stanchion. The base of the stanchion can be attached to the floor or to the seat, thus accommodating different locations of the stanchions as required by a particular bus construction. The above rails are common in Europe but are not widely used in North America.

In addition, it is necessary at the interior of the roof to provide air transportation ducts so that heated air when necessary for heating the bus or cooled air when necessary for cooling the bus or simply ventilation air when neither heating nor cooling is required is transmitted longitudinally of the bus from a supply fan to reach the individual passengers.

Examples of such ceiling mounted ducts are shown in U.S. Pat. Nos. 4,574,336 and 5,857,758 both issued to Transmatic Inc. In both cases, the air transportation duct is associated with and located behind a lighting and advertisement card mounting structure positioned at the cornice between the horizontal roof portion and the vertical side wall. This leaves the central area between the inner most edge of the lighting free from structural elements along the aisle so that the maximum headroom is provided on the underside of the roof and the stanchions can be attached to the roof at spaced portions along the length of the roof.

In recent years, low floor buses have been introduced where the height of a front section of the floor is reduced to the minimum height necessary to clear the axles and suspension so as to eliminate steps at the entrance to the bus. In order to maintain the total overall stiffness of the side wall of the bus, the total overall height has been maintained equal to that of conventional bus structures. Thus the length of the side wall from the bottom of the window to the bottom edge of the side wall is reduced but this is compensated by an increase in the height of the side wall above the top edge of the window. In this way the spacing from the ceiling to the floor is increased. This also acts to maximize the volume within the bus and provide the maximum head room and the maximum feeling of spaciousness within the bus.

SUMMARY OF THE INVENTION

It is one object of the present invention, therefore, to provide an improved inferior structure for a public transit vehicle, particularly in regard to the air supply to the passengers and in regard to the arrangement of ceiling panels and stanchions. Such an arrangement also can provide space for the storage of air tanks, fluid lines, electrical harnesses and other equipment such that these elements can be mounted above the ceiling rather than under the floor.

According to a first aspect of the invention there is provided a public transit vehicle comprising:

a vehicle body having:
- a roof,
- two side walls each extending longitudinally of the vehicle including an upper side wall portion connecting to the roof and a row of windows underneath the upper portion,
- a vehicle floor connected to the side walls and spanning therebetween;
- two rows of seats for seated passengers each along a respective one of the side walls at the windows and defining a central aisle therebetween for standing and moving passengers;
- and an air supply system for supplying air to the passengers comprising:
  - an air supply assembly including a main drive fan mounted at the roof;
  - an air transfer ducting arrangement connected to the air supply assembly and receiving air therefrom, the ducting arrangement being located underneath The roof at the roof, centrally of the roof and longitudinally of the vehicle body;
  - a first plurality of feeder ducts extending from the ducting arrangement across the roof to one side wall, the feeder ducts being spaced longitudinally along the vehicle body so as to communicate with different sections of said one side wall;
  - a second plurality of feeder ducts extending from the ducting arrangement across the roof to the other side wall, the feeder ducts being spaced longitudinally along the vehicle body so as to communicate with different sections of said other side wall;
  - each section of each of the side walls including air distribution elements for distributing the air to passengers at the section.

Preferably the vehicle body includes a ceiling panel above the heads of the standing passengers and below the roof and wherein the ducting arrangement is provided above the ceiling panel.

Preferably the ducting arrangement is defined at the top by the roof and at the bottom by the ceiling panel.

Preferably the ceiling panel has openings along side edges thereof for discharging cooled air.

Preferably the air distribution elements include a duct along the top of the windows and openings in the duct for discharging cooled air.

Preferably the air distribution elements include a diverter valve arrangement which can be moved to direct cooled air to the top of the windows and heated air to the bottom of the windows and to a position adjacent the floor.

Preferably the air distribution elements include a duct defined through a framing post of the vehicle for communicating heated air downwardly from the top of the side wall to a position below the windows adjacent the floor.

Preferably the air distribution elements include a chamber defined in the side wall below the windows by an internal panel of the side wall, the chamber being arranged to be filled by heated air and including top and bottom discharge openings to allow heated air to discharge upwardly from a top of the chamber onto the window and from a position adjacent the bottom of the chamber.

Preferably the air distribution elements include a duct defined through a framing post of the vehicle for communicating heated air downwardly from the top of the side wall to a the chamber.

Preferably there is provided a lighting housing arranged along each side of the ducting arrangement and wherein the feeder ducts comprise individual duct elements separate from the lighting housing and passing above the lighting housing.

Preferably there is provided two stanchion support rails each extending longitudinally of the roof on a respective side of the ducting arrangement, wherein there is provided a plurality of passenger stanchions at spaced positions along the aisle at respective sides of the aisle and attached to a respective one of the support rails.

Preferably the vehicle body includes a ceiling panel above the heads of the standing passengers and below the roof and wherein the ceiling panel extends between and is supported by the support rails.

Preferably the ceiling panel extends across the aisle at a height lower than the support rails.

According to a second aspect of the invention there is provided a public transit vehicle comprising:
a vehicle body having:
a roof,
two side walls each extending longitudinally of the vehicle including an upper side wall portion connecting to the roof and a row of windows underneath the upper portion,
a vehicle floor connected to the side walls and spanning therebetween;
two rows of seats for seated passengers each along a respective one of the side walls at the windows and defining a central aisle therebetween for standing and moving passengers;
two stanchion support rails each extending longitudinally of the roof on a respective side of the central aisle, each rail having a plurality of passenger stanchions at spaced positions along the rail at a respective side of the aisle;
and a ceiling panel above the heads of the standing passengers and below the roof which extends between the support rails.

Preferably the ceiling panel extends across the aisle at a height lower than the support rails.

Preferably the ceiling panel has edges thereof supported by respective ones of the support rails.

Preferably the ceiling panel is wider than the width of the aisle at the top of the seats and wherein the stanchions are inclined upwardly and outwardly from the top of the seats to the rails.

Preferably the stanchions are curved so as to have a convex curvature facing inwardly of the aisle.

Preferably some of the stanchions have a bottom end connected to the top of one of the seats and some have a bottom end connected to the floor and wherein those with the bottom end connected to the floor have a bottom portion inclined outwardly and downwardly such that the bottom end attached to the floor is spaced outwardly of an intermediate portion.

Preferably the intermediate portion is arranged at approximately the same height as a seat bottom and wherein the stanchion is inclined upwardly and outwardly from the intermediate portion to the support rail.

According to a third aspect of the invention there is provided a public transit vehicle comprising:
a vehicle body having:
a roof,
two side walls each extending longitudinally of the vehicle including an upper side wall portion connecting to the roof and a row of windows underneath the upper portion,
a vehicle floor connected to the side walls and spanning therebetween;
two rows of seats for seated passengers each along a respective one of the side walls at the windows and defining a central aisle therebetween for standing and moving passengers;
and a plurality of passenger stanchions, wherein some of the stanchions have a bottom end connected to the top of one of the seats and some have a bottom end connected to the floor and wherein those with the bottom end connected to the floor have a bottom portion inclined outwardly and downwardly such that the bottom end attached to the floor is spaced outwardly of an intermediate portion and wherein the stanchion is inclined upwardly and outwardly of the aisle from the intermediate portion to a support adjacent the roof.

BRIEF DESCRIPTION OF THE DRAWINGS

One embodiment of the invention will now be described in conjunction with the accompanying drawings in which:

FIG. 4 is a cross sectional view similar to that of FIG. 2 and showing a lower part only of the vehicle on a larger scale.

FIG. 5 is a cross sectional view of a portion only of FIG. 4 on a further enlarged scale.

DETAILED DESCRIPTION

Figure 1:
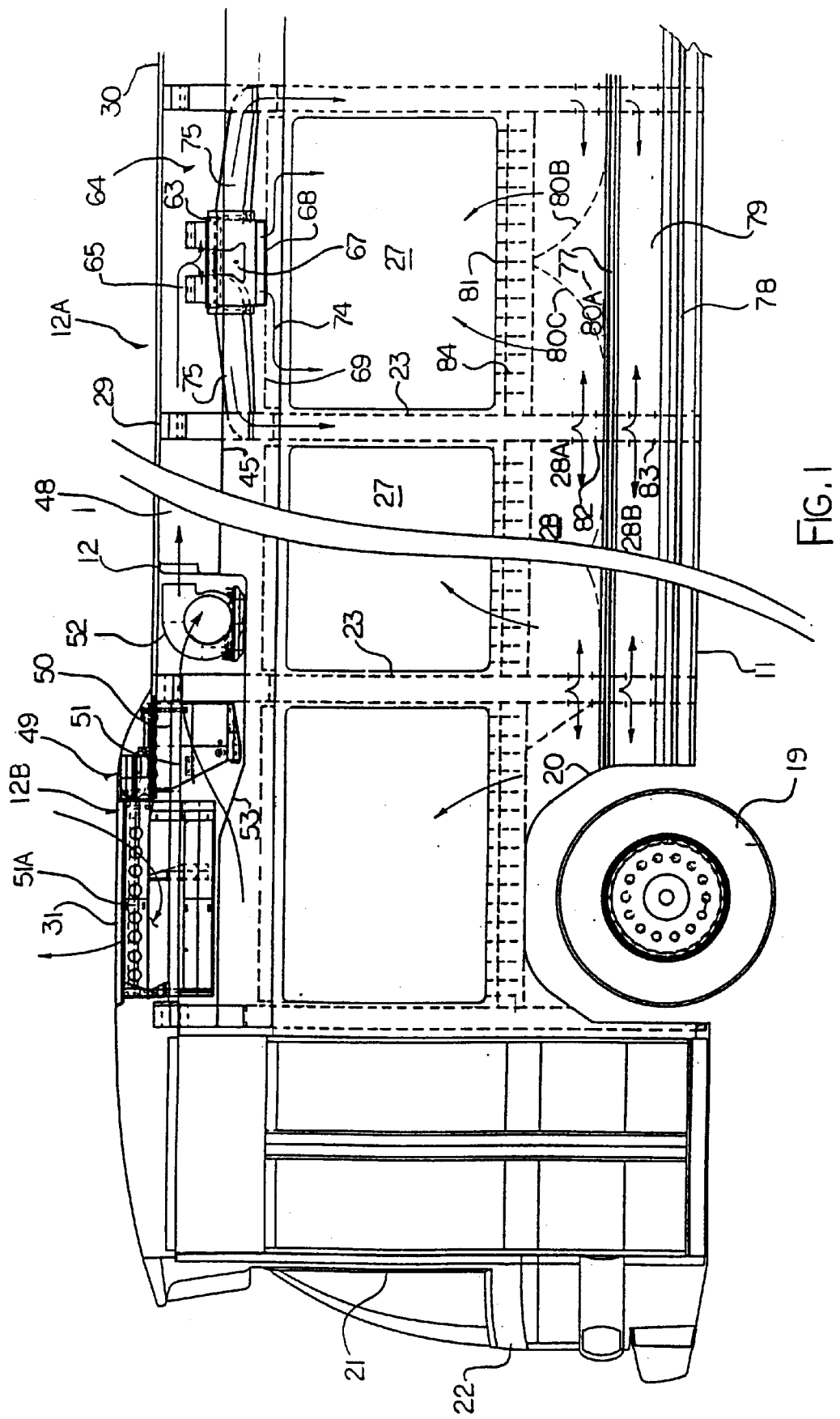
FIG. 1 is a vertical longitudinal cross sectional view through a public transit vehicle according to the present invention.
Figure 2:
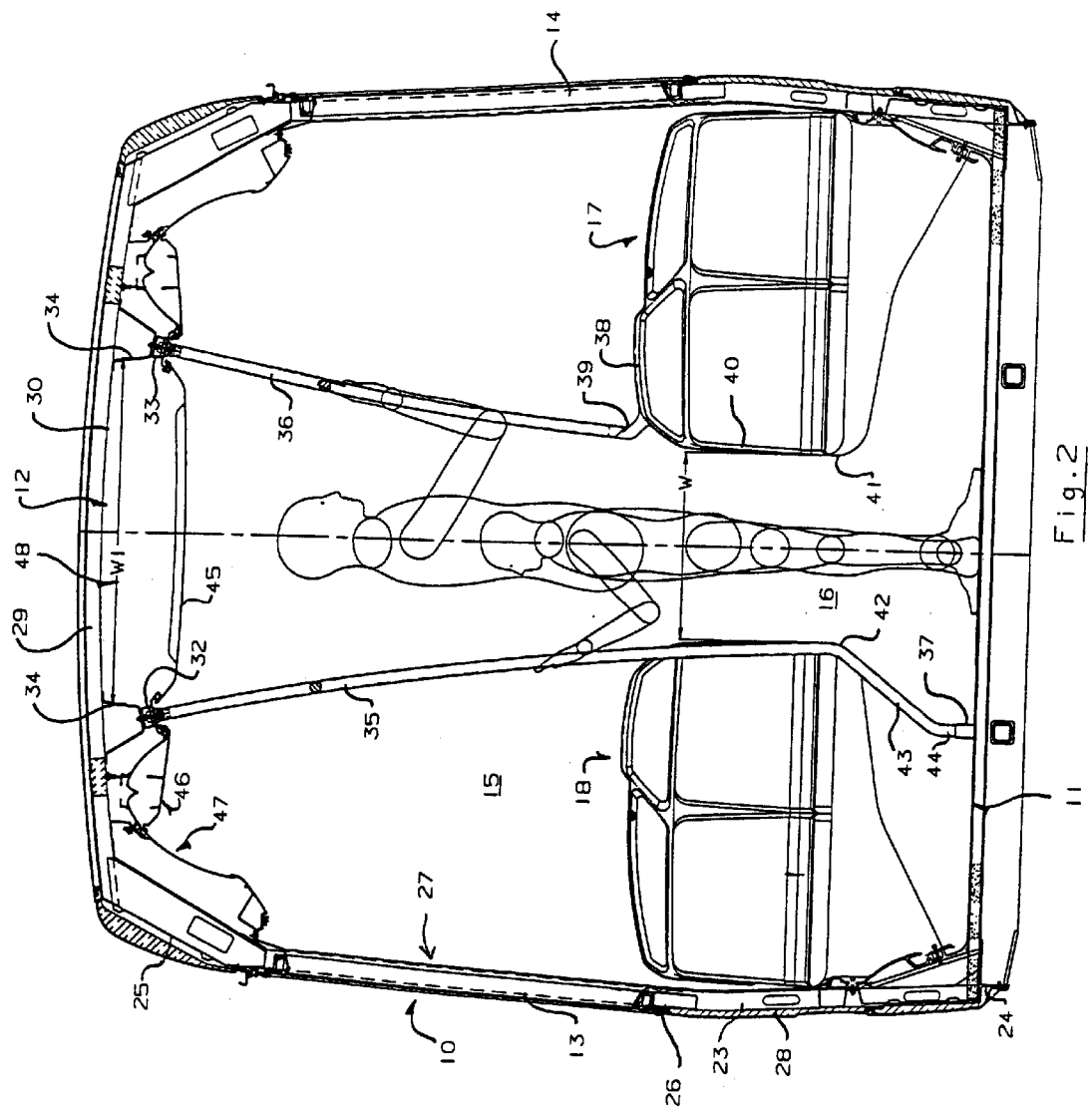
FIG. 2 is a vertical transverse cross sectional view through the vehicle of FIG. 1.

In FIGS. 1 and 2 is shown the general construction of a transit bus according to the present invention. It will be appreciated that the present invention is primarily directed to city buses for mass transit of the public where the low floor structure is particularly advantageous but the same invention can be applied in other vehicles for transportation of passengers.

The bus as illustrated comprises a vehicle body 10 having a floor structure 11, a roof structure 12 and two side walls 13 and 14 thus defining an interior volume 15 for receiving passengers. The interior of the bus defines a central aisle 16 with a first row 17 of seats on one side of the aisle and a second row of seats 18 on the other side of the aisle.

The seats are shown as two passenger seats side by side but other arrangements of seats can be accommodated including rearwardly facing seats and inwardly facing seats as required. In addition some areas of the bus may have the seats omitted so as to further maximize the number of passengers which can be accommodated since standing passengers require less floor area than seated passengers.

The forward part of the bus as shown in FIG. 1 includes a pair of ground wheels 19 received within a wheel housing 20 which projects into the interior of the bus due to the relatively low floor which is located at a height just above the suspension system (not shown). The forward part of the bus further includes a driver's compartment but this is not shown since it is well known to one skilled in the art. The cross section shown in FIG. 1 shows the side of the bus opposite to the drivers compartment thus illustrating a forward entry and departure door 21 located in front of the wheel housing 20. The bus further includes a front wall 22 in front of the door 21 and extending from the floor 11 to the roof structure 12.

Each side wall 13, 14 includes a plurality of vertical posts 23 extending from a side rail 24 at the floor 11 to a cornice structure 25 at the roof structure 12. The posts 23 are interconnected by longitudinally extending rails 26 which divide the side wall into an upper window section 27 and a lower closed panel section 28. Thus each window opening is defined between two of the posts 23, above the respective portion of the rail 26 and below the respective portion of the cornice 25.

On the exterior of the side wall is provided an exterior side wall cladding Which is not described herein in detail but is the subject of one of the above mentioned applications and the disclosure of that application is incorporated herein by reference.

Within the window opening is located a window structure and again the window structure forms the subject of a second of the above applications. Full details of the window structure are not necessary for this application and therefore are not included herein however the details are available from the above mentioned application and the disclosure of that application is incorporated herein by reference and can be referred to if required.

The roof structure 12 in a main section 12A of the roof is defined by a plurality of longitudinally spaced transverse roof bows 29 on which is applied a roof panel 30. The detail of the roof structure is again described in one of the above applications the disclosure which is incorporated herein by reference.

At the forward part of the roof structure is provided a raised section 12B in which the roof panel 30 is raised to a greater height to form a raised roof section 31.

Two stanchion mounting rails 32 and 33 are provided along the roof with each rail being attached to the roof bows 29 by a plurality of U-shaped brackets 34. Thus the rails are fixed at a height spaced downwardly from the roof bows and extend substantially along the full length of the bus section to support the stanchions within that section. Each stanchion support rail therefore provides a top support for a plurality of stanchions 35 and 36 arranged at spaced positions along the bus section on each respective side of the aisle 16. Some of the stanchions 35 extend from the rail 32 to a bracket 37 at the floor. Some of the stanchions 36 extend from the rail 33 to a seat rail structure 38 on a respective one of the seats. The seat rail structure defines hand rails across the top of the seat back which can be used by a passenger seated in the seat behind to pull themselves up to a standing position to allow grasping of the generally upright stanchion 36 to enter the aisle and move to the door 21. The seat rail 38 thus includes an upwardly extending stub mounting portions clamped at the end of the seat rail at the aisle so that the bottom end of the stanchion 36 engages into the mounting portion and is fixed thereto.

Thus there are two types of stanchions including the floor mounted stanchion and the seat mounted stanchion but each follows a common path extending from the respective rail to a position at the side of the aisle aligned with the edges 40 of the seats 17 and 18. Thus in effect the width of the aisle at the seats is defined by the width of the seats as indicated at W. The spacing between the rails 32 and 33 is substantially increased up to a width W1 greater than the width W. Also the stanchions are slightly curved so that a convex side of the curvature faces into the aisle thus providing a smooth attractive flow of the stanchion downwardly and inwardly from the respective rail from the width W1 at the respective rail to the narrowest section of the stanchions at the bottom of the seat and adjacent the knees or thighs of the standing passenger.

The stanchions 36 terminate at the mounting portion 39 and do not extend into the area of the seat back or the seat bottom. The stanchion 35 however extend to the floor and thus include a portion alongside the line of the seat edge 40 although there may be no seats at the actual stanchion but will be appreciated that the of the seat edge line 40 forms a common plane along the bus interior defined by other seats in front and rearwardly of the area where the stanchion 35 is located. At the height of the seat bottom indicated at 41, the stanchion 35 reaches its innermost and lowermost point at the aisle and at that point is bent at an innermost bottom portion 42 so as to extend downwardly and outwardly of the aisle in a portion 43 connected to a vertical section 44 attached to the bracket 37.

The shape and arrangement of the stanchions therefore provides the portion 43 which is inclined outwardly and downwardly and thus moves the bracket 37 away from the aisle so as to prevent a tripping hazard. Thus the standing passenger has an area underneath the innermost bottom portion 42 to receive the feet of the standing passenger without butting the bracket 37.

The shape and arrangement of the stanchions by which they curve gradually and are inclined upwardly and outwardly provides an effective arrangement which allows a smaller standing passenger such as a child to grasp the stanchion at a location or to be close to the body of that person. Also the increased width to the upper area of the stanchion allows an increased dimension of the effective width of the aisle in the area above the seated passengers so that the width of the aisle is maximixed in the head area of a larger standing passenger. This allows a greater density of passengers in the aisle since the perception of density is determined by the passenger at his or her head area. In addition a passenger standing at the center of the aisle stands more comfortably in view of the increased width of the aisle at the upper part since that larger passenger has longer arms and therefore requires a slightly greater spacing from the center line of the aisle than does the smaller passenger.

Between the rails 32 and 33 is provided a ceiling panel 45 which is attached at each side to a flange portion of the respective rail so as to be carried by the rail and spans the space therebetween.

Between the outside of the rail and the respective side wall is provided a lighting assembly 46 and an advertising panel 47. These elements are more clearly described in one of the above applications the disclosure of which is incorporated herein by reference.

The area between the roof panel 30 and the ceiling panel 45 defines an air distribution ducting arrangement in the form of a primary duct 48 for the transmission of ventilation air, which can be heated or cooled as required, for supply to the passengers as described in more detail hereinafter. The primary duct 48 communicates with an air supply assembly 49 mounted within the raised section 12B of the roof. The air supply assembly includes a heating coil 50 which receives heat from a suitable heating source, a cooling coil 51 which receives cool from condenser 51A and a fan 52 which draws air through the heating and cooling system as required from a return air inlet opening 53 for injection into the duct 48. An exterior air inlet can also be provided (not shown). The air supply assembly is shown only schematically since this is well known to one skilled in the art and since the details can be varied in accordance with requirements which depend upon the environmental conditions within which the bus is operated. The air supply assembly is located under the raised roof section 31 and above the ceiling panel 45 so that the area available for the air supply system projects into the interior of the bus to a position just below the panel 45, but not below the minimum allowable roof height according to regulation, thus allowing the height of the raised section relative to the remainder of the roof to be minimized.

Figure 3:
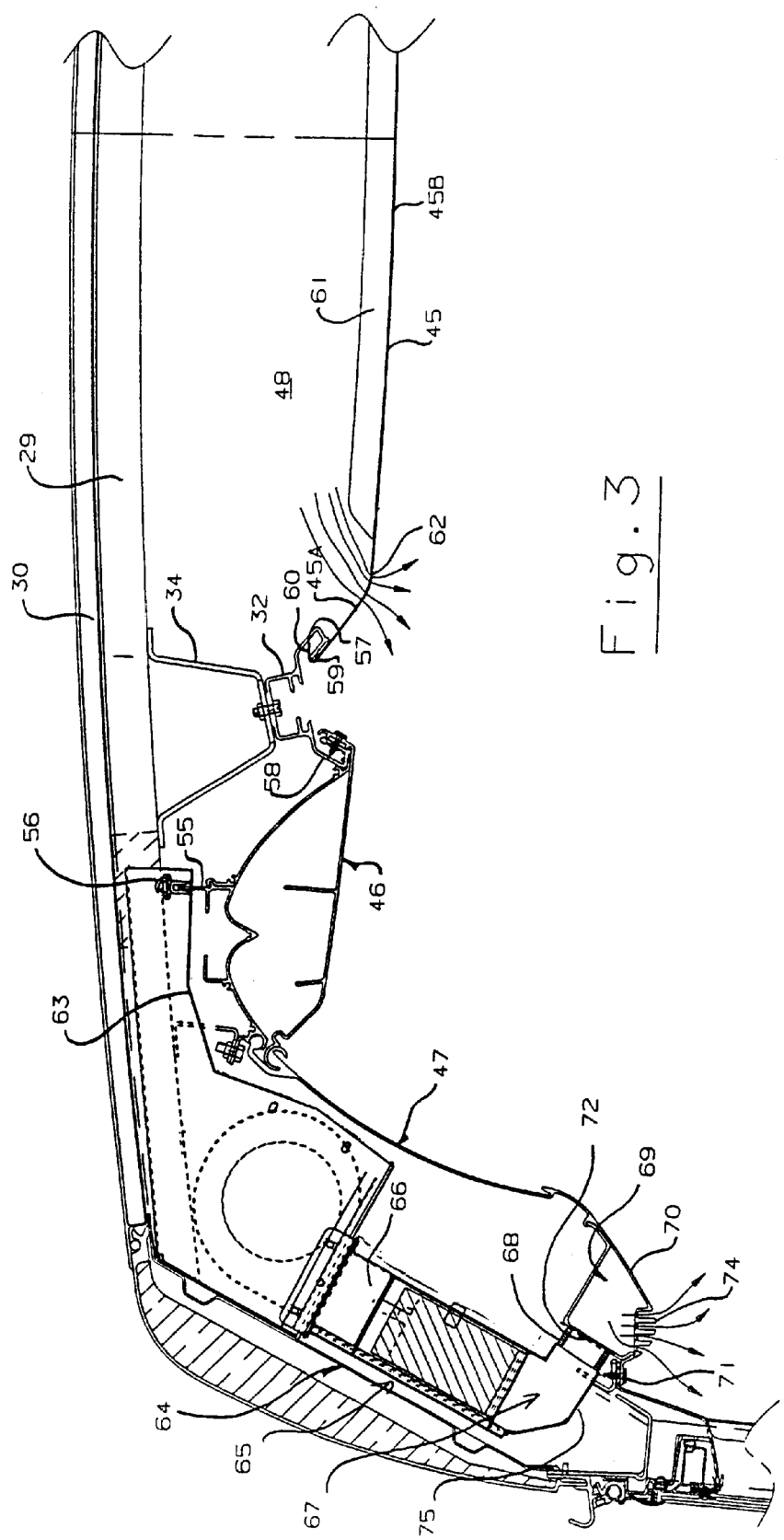
FIG. 3 is a cross sectional view similar to that of FIG. 2 and showing an upper part only of the vehicle on a larger scale.

Turning now to FIG. 3, the lighting assembly 46 includes a structural flange 55 extending along the length of the lamp housing. The flange 55 is received within a sealing member 56 extending along the length of the bus and butting against strips of insulation between each pair of the roof bows and extending from the member 56 to the roof panel so that the flange 55, the insulation strip and the sealing member 56 define side wall of the duct 48 on one side of the duct with the other side being symmetrical.

The mounting rail 32 includes two side flange portions 57 and 58 each of which includes a portion extending downwardly and outwardly from the rail followed by a U shaped section which forms an upwardly and inwardly extending flange 59. The edge of the duct 48 includes a lip 60 which engages over the flange 59 to hold the ceiling panel 45 in place but removable from the respective rail. The ceiling panel can thus be pivoted downwardly to allow access to the duct and additional elements mounted within the ducts such as electrical components and the like.

The ceiling panel 45 has on its upper surface a layer of foam 61 which extends over the majority of the width of the panel leaving areas on each side of the foam which are free from the foam between the lip 60 and an edge 61 of the foam 61. Each of these areas along the respective sides of the panel adjacent the rails 32 and 33 includes a series of holes 62 through which air can escape from the duct 48 for supplying ventilation air, either heated or cooled as required, to the passengers at a position above the passengers and adjacent the faces of the standing passengers.

The panel 45 has at its side edges the portions 45A which extend upwardly and outwardly to the lip 60. Thus a generally horizontal bottom surface 45B of the panel is arranged at a height below the top of the stanchion. This panel is therefore located at a height above the height of the tallest passenger but provides a ceiling which is brought down to a position closely adjacent to the passenger to provide an attractive appearance and to allow the areas outside of that ceiling area to be recessed again to increase the attractiveness of the structure and to provide space in which to recess the lighting assembly. The duct area above the panel can also receive tanks, fluid lines, electrical harnesses and other equipment thus conveniently stored above the ceiling.

A plurality of feeder ducts 63 are provided for supplying the air from the primary duct 48 to respective ones of a plurality of air distribution elements generally indicated at 64 at the side wall.

Each air distribution element 64 includes a fan assembly 65, preferably including two fans driven by a common motor, which share an inlet 66 connected to an outer end of the duct 63. The duct 63 is independent of the lighting assembly 46 and the advertising panel 47 and simply forms a separate duct bridging across the area between the hole in the flange 55 and the end of the fan. At the edge of the fan is provided a flap valve schematically indicated at 67 which can be moved from a first position used in cooling air to a second position used in heating air. In the cooling air position, the air from the fan is communicated to a further duct 68 which extends from the outlet of the fan to a longitudinally extending cooling air supply duct 69. The duct 69 is formed by a first wall 70 bridging the space between the bottom edge of the panel 47 and a mounting 71 at the side wall. A backing wall 72 is attached to the first wall 70 and defines the duct 69 in the shape of a channel therebetween. The duct 69 extends longitudinally along the full length of the structure and is supplied by a plurality of the duct 68 each associated with a respective one of the fan assemblies 65. Thus in the cooling condition cooled air is supplied through the hole 62 and through discharge vents 74 at the bottom of the duct 69. Thus the cooling air is supplied from above to the faces of the standing passengers and downwardly from the hole 62 and vent 74 to the seated passengers and across the windows so as to absorb the energy radiating therefrom and cooling the seated passengers.

Each air distribution system serves one of the window bays and a part of the next adjacent bay on each side so that the air distribution systems are arranged in alternate window bays.

In the event that the system is set for heated air, the valve 67 is moved to a second position at which the air from the fan is supplied to two ducts 75 each transporting that air into an opening in a side wall of a respective one of the main posts 23. Thus the heated air is supplied through the hollow interior of the post 23 downwardly along the post between each window bay and the next. The number of fan assemblies is thus equal to one half of the number of posts so that two posts are supplied by each fan assembly to provide sufficient air flow to communicate air through the post and to discharge that air into a lower part of the air distribution system 64 as best shown in FIG. 4.

The lower panel section 28 of the side wall is separated from the window section by the horizontal rail 26. The lower panel section is closed on its outside surface by an insulated cladding 76. The lower panel section 28 is divided into an upper part 28A and a lower part 28B by transverse walls 28C of a bottom skirt section.

The details of the exterior cladding and the skirt are shown in one of the above applications and are incorporated herein by reference.

On the inside of the side wall is provided a first mounting bracket 77 and a second mounting bracket 78 for cantilever support of the seat. Between a bottom of the bracket 77 and the top of the bracket 78 is provided a first sheeting panel 79 which closes the area 28B and faces inwardly toward the legs of the seated passenger. At the top of the bracket 77 is provided a further sheeting panel 80 which extends from the top of the bracket 77 upwardly to an outwardly turned top edge 81 which engages over the rail 26 and projects inwardly to a position closely adjacent to a frame rail 27A of the upper window section 27.

The posts 23 have in each side wall a pair of discharge openings 82 and 83. The openings 82 allow the discharge of heated air into a chamber defined by the upper part 28A of the panel section 28. The discharge openings 83 allow discharge of heated air into a chamber defined by the lower part 28B of the panel section 28. The dimensions of the ducts and the openings are selected to supply required amounts of air to the various portions in accordance with well known air flow calculations.

The air flow into the upper part 28A acts to heat the panel 80 to provide radiant heat to the seated passenger. Behind the panel 80 and in front of the outer cladding is provided a block of rigid foam insulation indicated 80A which has two curved upper surfaces 80B and 80C each arranged adjacent a respective one of the openings 82 in the respective post so that the upper surface 80B, 80C acts to direct the air from the opening 82 upwardly toward the window. The air passes upwardly between a series of vertical horizontally spaced fins 84 which space the outside surface of the panel 80 from the rail 26 and from the window frame and at the same time act to stiffen the panel 80 in those areas thus forming a series of ducts through which the air can pass to escape at the top edge 81 adjacent the rail 27A onto the window pane at its lower edge to effect heating of the vehicle in that area and to effect defrosting of the window. The construction of the window is shown and described in more detail in a co-pending application identified hereinbefore.

The air in the lower part 28B passes through an opening 85 in the bracket 78 so as to emerge from the bottom edge of the panel 79 and pass downwardly toward the floor to act to heat the area of the floor and to allow the heat to rise up into the seating area to heat the seated passengers. Radiant heat is also emitted by the panel 79.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A public transit bus comprising:
   a bus body having:
      a roof,
      two side walls each extending longitudinally of the bus including an upper side wall portion connecting to the roof and a row of windows underneath the upper portion,
      a bus floor connected to the side walls and spanning therebetween;
      two rows of seats for seated passengers each along a respective one of the side walls at the windows and defining a central aisle therebetween for standing and moving passengers;
      and an air supply system for supplying air to the passengers comprising:
         an air supply assembly including a main drive fan mounted at the roof;
         an air transfer ducting arrangement connected to the air supply assembly and receiving air therefrom, the ducting arrangement being located underneath the roof at the roof, centrally of the roof and longitudinally of the bus body;
         a first plurality of individual feeder ducts each extending from the ducting arrangement across the roof to one side wall, the feeder ducts being spaced longitudinally along the bus body so as to communicate with respective ones of a plurality of different sections of said one side wall;
         a second plurality of feeder ducts extending from the ducting arrangement across the roof to the other side wall, the feeder ducts being spaced longitudinally along the bus body so as to communicate with respective ones of a plurality of different sections of said other side wall;
         each section of each of the side walls including air distribution elements mounted in the side wall for distributing the air to passengers at the section.

2. The bus according to claim 1 wherein the bus body includes a ceiling panel above the heads of the standing passengers and below the roof and wherein the ducting arrangement is provided above the ceiling panel.

3. The bus according to claim 2 wherein the ducting arrangement is defined at the top by the roof and at the bottom by the ceiling panel.

4. The bus according to claim 2 wherein the ceiling panel has openings along side edges thereof for discharging cooled air.

5. The bus according to claim 1 wherein the air distribution elements include a duct along the top of the windows and vents in the duct for discharging cooled air.

6. The bus according to claim 1 wherein the feeder ducts and the air distribution elements in each section can be arranged in one alternative to direct cooled air to the top of the windows and can be arranged in a second alternative to direct heated air to the bottom of the windows and to a position adjacent the floor.

7. The bus according to claim 1 wherein the air distribution elements include a framing post of the bus which defines a duct for communicating heated air downwardly from the top of the side wall to a position below the windows adjacent the floor.

8. The bus according to claim 1 wherein the air distribution elements include a chamber defined in the side wall below the windows by an internal panel of the side wall, the chamber being arranged to be filled by heated air and including top and bottom discharge openings to allow heated air to discharge upwardly from a top of the chamber onto the window and from a position adjacent the bottom of the chamber.

9. The bus according to claim 8 wherein the air distribution elements include a framing post of the bus which defines a duct for communicating heated air downwardly from the top of the side wall to the chamber.

10. The bus according to claim 1 wherein there is provided a lighting housing arranged along each side of the ducting arrangement and wherein the feeder ducts are separate from the lighting housing and pass over the lighting housing.

11. The bus according to claim 1 wherein there is provided two stanchion support rails each extending longitudinally of the roof on a respective side of the ducting arrangement, wherein there is provided a plurality of passenger stanchions at spaced positions along the aisle a respective side of the aisle and attached to a respective one of the support rails and wherein the feeder ducts comprise individual duct elements passing over the stanchion support rails.

12. The bus according to claim 11 wherein the bus body includes a ceiling panel above the heads of the standing passengers and below the roof and wherein the ceiling panel extends between and is supported by the support rails.

13. The bus according to claim 12 wherein the ceiling panel extends across the aisle at a height lower than the support rails.

14. The bus according to claim 1 wherein there are provided two stanchion support rails each extending longitudinally of the roof on a respective side of the ducting arrangement, wherein there is provided a plurality of passenger stanchions at spaced positions along the aisle a respective side of the aisle and attached to a respective one of the support rails, wherein there is provided a lighting housing arranged along each side of the ducting arrangement and each stanchion support rail carries an inner edge of the respective lighting housing.

15. A public transit bus comprising:
   a bus body having:
      a roof having a plurality of transverse roof bows spaced longitudinally of the roof,
      two side walls each extending longitudinally of the bus including an upper side wall portion connecting to the roof and a row of windows underneath the upper portion,
      a bus floor connected to the side walls and spanning therebetween;
      two rows of seats for seated passengers each along a respective one of the side walls at the windows and defining a central aisle therebetween for standing and moving passengers;
      two stanchion support rails each extending longitudinally of the roof each on a respective side of the central aisle so as to define a horizontal space between the rails, each rail having a plurality of passenger stanchions attached thereto and extending downwardly therefrom at spaced positions along the rail;
      each stanchion support rail being spaced downwardly from an underside of the roof bows so as to leave a vertical space between the underside of the roof bows and the rail;
      and a ceiling panel above the heads of the standing passengers, the ceiling panel being connected at each side edge thereof to a respective one of the support rails and supported thereby so as to extend across a horizontal space therebetween;
      the ceiling panel being arranged below the roof leaving a vertical space between the underside of the roof bows and the ceiling panel.

16. The bus according to claim 15 wherein the ceiling panel extends across the aisle at a height lower than the support rails.

17. The bus according to claim 15 wherein the ceiling panel is wider than the width of the aisle at the top of the seats and wherein the stanchions are inclined upwardly and outwardly from a position on the stanchions at the top of the seats to the rails.

18. The bus according to claim 17 wherein the stanchions are curved so as to have a convex curvature facing inwardly of the aisle.

19. The bus according to claim 15 wherein some of the stanchions have an intermediate portion arranged at a height above the floor, a bottom portion extending downwardly from the intermediate portion to the floor and a bottom end connected to the floor and wherein the bottom portion is inclined outwardly away from the central aisle and downwardly such that the bottom end attached to the floor is spaced outwardly of the intermediate portion.

20. The bus according to claim 19 wherein the intermediate portion is arranged at approximately the same height as a seat bottom and wherein the stanchion is inclined upwardly and outwardly from the intermediate portion to the support rail.

21. The bus according to claim 15 wherein there is provided on each side of the aisle a lighting housing arranged along a respective side of the ceiling panel and each stanchion support rail carries an inner edge of the respective lighting housing.

22. A public transit bus comprising:
   a bus body having:
      a roof,
      two side walls each extending longitudinally of the bus including an upper side wall portion connecting to the roof and a row of windows underneath the upper portion,
      a bus floor connected to the side walls and spanning therebetween;
      two rows of seats for seated passengers each along a respective one of the side walls at the windows and defining a central aisle therebetween for standing and moving passengers;
      and a plurality of passenger stanchions;
      some of the stanchions being seat stanchions which have a bottom end connected to the top of one of the seats;
      and some of the stanchions being floor stanchions which have a bottom end connected to the floor, a bottom portion connected to the bottom end and extending upwardly therefrom and an intermediate portion connected to the bottom portion at a height above the floor and extending upwardly;
      wherein the bottom portion of the floor stanchions is inclined outwardly away from the central aisle and downwardly such that the bottom end is attached to the floor at a position spaced outwardly of the intermediate portion;
      and wherein each of the floor stanchions includes an upper portion above the intermediate portion which is inclined upwardly and outwardly of the aisle from the intermediate portion to a support adjacent the roof.

23. The bus according to claim 22 wherein the intermediate portion is arranged at approximately the same height as a seat bottom.

24. The bus according to claim 22 wherein the upper portions of the stanchions are curved so as to have a convex curvature facing inwardly of the aisle.

* * * * *